United States Patent
Hirabayashi

(10) Patent No.: US 9,502,919 B2
(45) Date of Patent: Nov. 22, 2016

(54) WIRELESS COMMUNICATION APPARATUS AND ELECTRONIC EQUIPMENT FOR HARVESTING POWER

(75) Inventor: Takayuki Hirabayashi, Tokyo (JP)

(73) Assignee: Sony Corporation, Tokyo (JP)

(*) Notice: Subject to any disclaimer, the term of this patent is extended or adjusted under 35 U.S.C. 154(b) by 478 days.

(21) Appl. No.: 13/556,763

(22) Filed: Jul. 24, 2012

(65) Prior Publication Data

US 2013/0035046 A1 Feb. 7, 2013

(30) Foreign Application Priority Data

Aug. 4, 2011 (JP) .................................. 2011-170740

(51) Int. Cl.
 *H04B 5/00* (2006.01)
 *H02J 7/02* (2016.01)
 *H02J 7/00* (2006.01)

(52) U.S. Cl.
 CPC .............. *H02J 7/025* (2013.01); *H02J 7/0068* (2013.01)

(58) Field of Classification Search
 CPC ....................................................... H02J 17/00
 USPC ............. 455/41.1, 522, 78; 340/10.34, 12.51
 See application file for complete search history.

(56) References Cited

U.S. PATENT DOCUMENTS

| 2008/0080449 | A1* | 4/2008 | Huang et al. .................. 370/342 |
| 2009/0010316 | A1* | 1/2009 | Rofougaran .................. 375/219 |
| 2011/0218014 | A1* | 9/2011 | Abu-Qahouq ................ 455/522 |
| 2011/0248834 | A1* | 10/2011 | Warner .................... H04Q 9/00 340/10.34 |
| 2011/0260839 | A1* | 10/2011 | Cook et al. .................. 340/10.4 |

FOREIGN PATENT DOCUMENTS

| JP | 2002-118480 | 4/2002 |
| JP | 2004-355164 | 12/2004 |
| JP | 2005-182643 | 7/2005 |
| JP | 2005-536150 | 11/2005 |
| JP | 2009-514292 | 4/2009 |

* cited by examiner

Primary Examiner — Sony Trinh
Assistant Examiner — Angelica M Perez
(74) Attorney, Agent, or Firm — Chip Law Group

(57) ABSTRACT

Provided is a wireless communication apparatus including at least one two-way antenna for power recovery, a wireless block processing a wireless signal which the two-way antenna for power recovery transmits and receives, a power recovery block recovering electric power from a received signal of the two-way antenna for power recovery, and a connection switching part connecting the two-way antenna for power recovery to and switching the connection between the wireless block and the power recovery block. A duty ratio at which the connection switching part connects the two-way antenna for power recovery to the wireless block and the power recovery block is set so that the wireless block attains a desired communication speed.

21 Claims, 10 Drawing Sheets

WIRELESS COMMUNICATION APPARATUS AND ELECTRONIC EQUIPMENT FOR HARVESTING POWER

BACKGROUND

The technology disclosed in the present specification relates to a wireless communication apparatus and electronic equipment transmitting and receiving radio wave signals, and specifically relates to a wireless communication apparatus and electronic equipment effectively utilizing spatial radio waves while transmitting and receiving the radio wave signals.

Various wireless transmission systems in which relatively high frequency bandwidths from hundreds MHz to several GHz are used for wireless transmission spread in recent years. For example, wireless LAN (Local Area Network) systems using the 2 GHz band, 5 GHz band or the like, wireless communication devices using from the 700 MHz band to the 2 GHz band for LTE (Long Term Evolution) or 3G communication systems, and electronic equipment loading wireless communication functions are developed and put into practical use.

Moreover, it is widely known that arrangement of a plurality of antennas attains diversity effects such as suppression of phasing due to multiple waves. For example, a transmitting and receiving antenna along with radiation diversity is proposed which includes first and second radiation elements connected to a transmitting and receiving circuit of electromagnetic signals via a network of power supplying lines at least on a substrate (for example, see National Publication of International Patent Application No. 2009-514292).

On the other hand, companies are starting to intensively develop applications of energy harvesting. For example, sensors or controllers whose power consumption is low can be driven using environmental energy not by the commercial power supply or batteries. Also in the field of communication, utilization of spatial radio waves is a task to be achieved as part of environmental power generation.

Power sources in the environmental power generation can include, for example, sunlight, vibration, heat, environmental electromagnetic waves. Some wireless communication devices and wireless communication systems using the environmental power generation are proposed (for example, see Japanese Patent Application Publication No. 2005-182643; Japanese Patent Application Publication No. 2004-355164; and Japanese Patent Application Publication No. 2002-118480). Moreover, an energy harvesting circuit is proposed in which an antenna receives energy in space and acquires part of it (for example, see National Publication of International Patent Application No. 2005-536150).

However, electric power radiated from electronic equipment is usually wasted without being used in fact. Meanwhile, radio waves from communication destination instruments and/or peripheral environments are received by an antenna to be rectified and recovered generally. In case that the antenna is shared by wireless communication and harvesting, whether the antenna can be used for the harvesting varies in accordance with a communication state, usage of the communication instrument and the like, whereas few technologies dynamically controlling the use of the antenna have been proposed.

SUMMARY

It is desirable to provide an excellent wireless communication apparatus and electronic equipment capable of effectively utilizing spatial radio waves while transmitting and receiving radio wave signals.

The present application is made in light of the foregoing. According to an embodiment of the present technology, a wireless communication apparatus includes at least one two-way antenna for power recovery, a wireless block processing a wireless signal which the two-way antenna for power recovery transmits and receives, a power recovery block recovering electric power from a received signal of the two-way antenna for power recovery, and a connection switching part connecting the two-way antenna for power recovery to and switching the connection between the wireless block and the power recovery block. A duty ratio at which the connection switching part connects the two-way antenna for power recovery to the wireless block and the power recovery block is set so that the wireless block attains a desired communication speed.

The wireless communication apparatus is configured such that the connection switching part fixes the connection of the two-way antenna for power recovery to the wireless block when the wireless block does not attain the desired communication speed even at a setting limit of the duty ratio.

The wireless communication apparatus includes plural two-way antennas for power recovery.

The wireless communication apparatus is configured such that the number of the plural two-way antennas for power recovery the connection of which the connection switching part fixes to the wireless block is increased stepwise when the wireless block does not attain the desired communication speed even at a setting limit of the duty ratio.

The wireless communication apparatus is configured such that an antenna the connection of which the connection switching part fixes to the wireless block from among the plural two-way antennas for power recovery is changed when the wireless block does not attain the desired communication speed even at the setting limit of the duty ratio.

The wireless block of the wireless communication apparatus is configured to perform communication processing in an MIMO manner when the connection switching part connects the plural two-way antennas for power recovery to the wireless block, perform the communication processing in an SISO manner when only one of the two-way antennas for power recovery is connected to the wireless block, and terminate the communication processing when no two-way antennas for power recovery are connected to the wireless block.

The wireless communication apparatus further includes at least one antenna exclusively for communication directly connected to the wireless block not via the connection switching part.

The wireless communication apparatus is configured such that the connection switching part fixes the connection of the two-way antenna for power recovery to the wireless block when the wireless block does not attain the desired communication speed even at a setting limit of the duty ratio.

The wireless block of the wireless communication apparatus is configured to perform communication processing in an MIMO manner concomitantly using the antenna exclusively for communication when the connection switching part connects at least one of the two-way antennas for power recovery to the wireless block, and perform the communication processing in an SISO manner when only one antenna exclusively for communication is connected to the wireless block.

According to another embodiment of the present technology, a wireless communication apparatus includes a plurality of wireless blocks each including a two-way antenna for power recovery and processing a wireless signal which the two-way antenna for power recovery transmits and receives, a power recovery block recovering electric power from a received signal of the two-way antenna for power recovery which each of the wireless blocks includes, and a selection part selecting the wireless block whose two-way antenna for power recovery is used to recover the electric power in the power recovery block.

The wireless communication apparatus is configured such that the plurality of wireless blocks use wireless frequencies different from one another.

The selection part of the wireless communication apparatus selects the wireless block whose two-way antenna for power recovery is used to recover the electric power in the power recovery block based on received signal strengths of the respective plurality of wireless blocks.

The wireless communication apparatus, each of the plurality of wireless blocks includes a connection switching part connecting its own two-way antenna for power recovery to and switching the connection between the wireless block and the power recovery block via the selection part.

The wireless communication apparatus is configured such that a duty ratio at which the connection switching part connects the two-way antenna for power recovery to the wireless block and the power recovery block is set so that the wireless block selected by the selection part attains a desired communication speed.

The wireless communication apparatus is configured such that the connection switching part fixes the connection of the two-way antenna for power recovery to the wireless block when the wireless block selected by the selection part does not attain the desired communication speed even at a setting limit of the duty ratio.

In the wireless communication apparatus, at least part of the plurality of wireless blocks each further includes at least one antenna exclusively for communication directly connected to itself not via the connection switching part.

According to another embodiment of the present technology, there is provided a wireless communication apparatus including a plurality of wireless blocks each processing a wireless signal, a two-way antenna for power recovery provided in each of the plurality of wireless blocks, a power recovery block recovering electric power from a received signal of the two-way antenna for power recovery which each of the wireless blocks includes, and a connection switching part provided in each of the plurality of wireless blocks, and connecting the two-way antenna for power recovery to and switching the connection between the wireless block and the power recovery block.

In the wireless communication apparatus, each of the plurality of wireless blocks includes a connection switching part connecting its own two-way antenna for power recovery to and switching the connection between the wireless block and the power recovery block via the connection switching part.

In the wireless communication apparatus, each of the plurality of wireless blocks includes a connection switching part connecting its own two-way antenna for power recovery to and switching the connection between the wireless block and the power recovery block via the connection switching part. The connection switching part provided in each of the plurality of wireless blocks is configured to set a duty ratio at which the two-way antenna for power recovery is connected to the wireless block and the power recovery block so that the wireless block attains a desired communication speed.

In the wireless communication apparatus, the each connection switching part provided in each of the plurality of wireless blocks is configured to fix the connection of the two-way antenna for power recovery to the wireless block when the desired communication speed is not attained even at a setting limit of the duty ratio.

At least part of the plurality of wireless blocks provided in the wireless communication apparatus further includes at least one antenna exclusively for communication directly connected to itself not via the connection switching part.

Further, according to another embodiment of the present technology, there is provided an electronic equipment including at least one two-way antenna for power recovery, a wireless block processing a wireless signal which the two-way antenna for power recovery transmits and receives, a power recovery block recovering electric power from a received signal of the two-way antenna for power recovery, and a connection switching part connecting the two-way antenna for power recovery to and switching the connection between the wireless block and the power recovery block. A duty ratio at which the connection switching part connects the two-way antenna for power recovery to the wireless block and the power recovery block is set so that the wireless block attains a desired communication speed.

Further, according to another embodiment of the present technology, there is provided an electronic equipment including a plurality of wireless blocks each including a two-way antenna for power recovery and processing a wireless signal which the two-way antenna for power recovery transmits and receives, a power recovery block recovering electric power from a received signal of the two-way antenna for power recovery which each of the wireless blocks includes, and a selection part selecting the wireless block whose two-way antenna for power recovery is used to recover the electric power in the power recovery block.

Further, according to another embodiment of the present technology, there is provided an electronic equipment including a plurality of wireless blocks each processing a wireless signal, a two-way antenna for power recovery provided in each of the plurality of wireless blocks, a power recovery block recovering electric power from a received signal of the two-way antenna for power recovery which each of the wireless blocks includes, and a connection switching part provided in each of the plurality of wireless blocks, and connecting the two-way antenna for power recovery to and switching the connection between the wireless block and the power recovery block.

According to the technology disclosed in the present specification, an excellent wireless communication apparatus and electronic equipment capable of effectively utilizing spatial radio waves while transmitting and receiving radio wave signals can be provided.

Moreover, according to the technology disclosed in the present specification, an excellent wireless communication apparatus and electronic equipment which can recover and use radio waves from a communication destination instrument and/or a peripheral environment preferably by performing switching of a communication circuit and a harvesting circuit connected to an antenna in accordance with a communication speed can be provided.

Moreover, according to the technology disclosed in the present specification, an excellent wireless communication apparatus and electronic equipment which can determine and select the largest in strength from among a plurality of wireless systems such as a wireless, WiMAX, WWAN, Bluetooth communication, RFID and WirelessHD and can recover and use radio waves preferably can be provided.

The technology disclosed in the present specification can be applied to information terminals such as an electronic book, notebook PC, tablet and communicator. Energy resources of spatial radio waves can be effectively utilized by switching of an operation between communication and harvesting in response to usage of the information terminal. Moreover, under the circumstances that the information terminal is close to access points and/or base stations, the far greater effect of power recovery is expected.

Other objects, features and advantages of the technology disclosed in the present specification will be apparent from the following detailed description of the embodiments and the accompanying drawings.

DETAILED DESCRIPTION OF THE EMBODIMENTS

Figure 1:
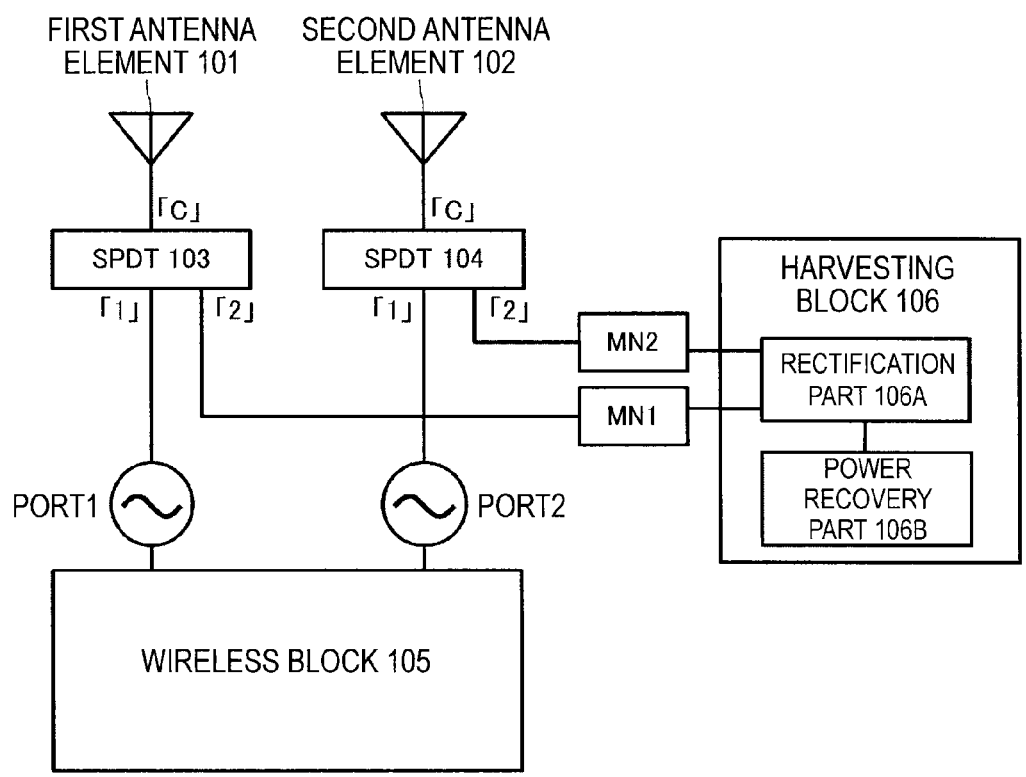
FIG. 1 is a diagram schematically illustrating a configuration of a wireless communication apparatus 100 according to a first embodiment of the technology disclosed in the present specification.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

FIG. 1 schematically illustrates a configuration of a wireless communication apparatus 100 according to a first embodiment of the technology disclosed in the present specification.

The wireless communication apparatus 100 illustrated in the figure includes a diversity antenna including a first antenna element 101 and a second antenna element 102. In an example of the configuration illustrated in the figure, both of the first antenna element 101 and the second antenna element 102 are antennas for both wireless communication and harvesting and are alternatively connected to a wireless block 105 or a harvesting block 106 respectively via SPDT (Single Pole Double Throw) switches 103 and 104. Specifically, the wireless block 105 and the harvesting block 106 are connected to a terminal on a "1" side and a terminal on a "2" side of each of the SPDT switches 103 and 104, respectively. Moreover, impedance matching parts MN1 and MN2 (Matching Network) are inserted between the terminals on the "2" side of the respective SPDT switches 103 and 104 and the harvesting block 106 on each transmission signal line.

The wireless block 105 includes a circuit module performing a wireless operation in a wireless system such as a wireless LAN, WiMAX, WWAN, Bluetooth communication, RFID and WirelessHD. Moreover, the harvesting block 106 includes a rectification part (rectifier and booster) 106A rectifying an input signal and a power recovery part 106B recovering an output from the rectification part 106A as a DC power source.

Upon enabling of the terminal on the "1" side of the SPDT switch 103, transmission power from the wireless block 105 is directly supplied to the first antenna element 101 and a wireless signal is radiated into the air. Moreover, a received signal of the first antenna element 101 is supplied to the wireless block 105 and receiving processing is performed in the wireless block 105. On the other hand, upon enabling of the terminal on the "2" side of the SPDT switch 103, the received signal of the first antenna element 101 is, after matching of its impedance in the MN1, inputted to the harvesting block 106 to be rectified and recovered as electric power.

Moreover, upon enabling of the terminal on the "1" side of the SPDT switch 104, the transmission power from the wireless block 105 is directly supplied to the second antenna element 102 and the wireless signal is radiated into the air. Moreover, the received signal of the second antenna element 102 is supplied to the wireless block 105 and the receiving processing is performed in the wireless block 105. When both of the terminals on the "1" side of the SPDT switches 103 and 104 are enabled, the first antenna element 101 and second antenna element 102 act as a diversity antenna and are used for the wireless operation in the wireless block 105. On the other hand, upon enabling of the terminal on the "2" side of the SPDT switch 104, the received signal of the second antenna element 102 is, after matching of its impedance in the MN2, inputted to the harvesting block 106 to be rectified and recovered as the electric power.

The wireless communication apparatus 100 can recover and use radio waves from a communication destination instrument and/or a peripheral environment preferably, by performing switching of the wireless block 105 and harvesting block 106 connected to each of the first antenna element 101 and second antenna element 102 in accordance with a communication speed in the wireless block 105.

Harvesting methods in the wireless communication apparatus 100 can include a "first harvesting mode" in which the switching between the wireless operation and harvesting is performed simultaneously for two of the first antenna element 101 and second antenna element 102, and a "second harvesting mode" in which the switching between the wireless operation and harvesting is performed only for any one of the first antenna element 101 and second antenna element 102.

Figure 2:
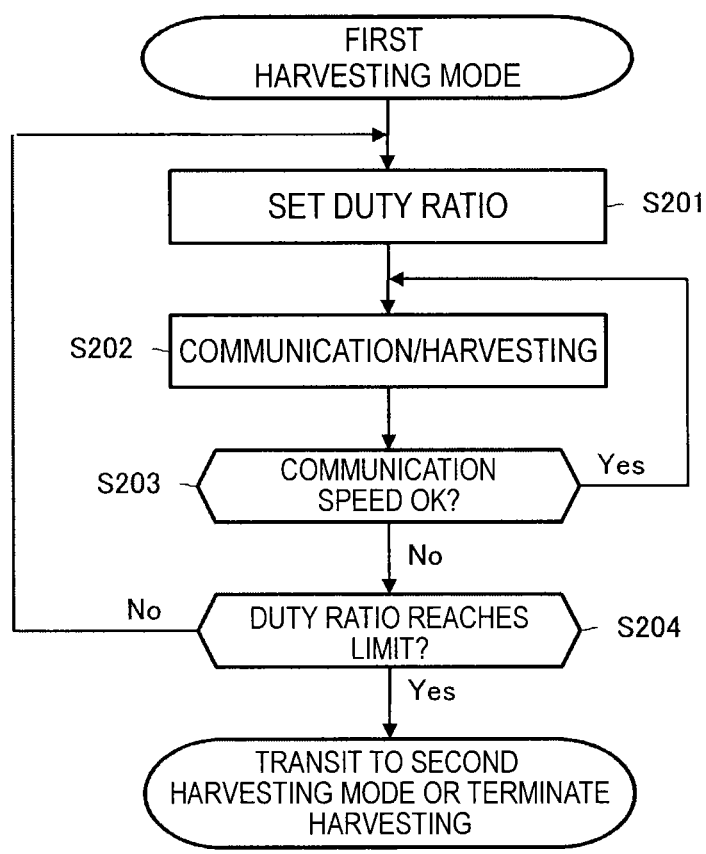
FIG. 2 is a flowchart illustrating an operation procedure in a first harvesting mode of the wireless communication apparatus 100.

FIG. 2 illustrates an operation procedure in the first harvesting mode of the wireless communication apparatus 100 as a form of a flowchart.

At first, a duty ratio for enabling the terminal on the "1" side of each of the SPDT switches 103 and 104 is set (step S201).

Then, the switching of each of the SPDT switches 103 and 104 in accordance with the set duty ratio is performed simultaneously. And the communication operating and harvesting simultaneously using two of the first antenna element 101 and second antenna element 102 are performed alternately (step S202).

Upon the enabling of the terminal on the "1" side of each of the SPDT switches 103 and 104, the wireless block 105 performs the communication operating simultaneously using two of the first antenna element 101 and second antenna element 102. Moreover, upon the enabling of the terminal on the "2" side of each of the SPDT switches 103 and 104, the harvesting block 106 performs the harvesting, that is, recovers the electric power from the received signals of two of the first antenna element 101 and second antenna element 102.

In addition, during the communication, the communication operating is always performed in an MIMO (Multiple Input Multiple Output) manner. The communication is cut off when one of the antenna elements is switched to the harvesting side.

Next, an average communication speed in a window for a constant time period during the communication operating of the wireless block 105 is measured. Then, whether a sufficient communication speed is attained even when the communication operating and harvesting are alternately performed simultaneously using two of the first antenna element 101 and second antenna element 102 is checked (step S203). Herein, in the case that the sufficient communication speed is attained (Yes in step S203), returning to step S202, the communication operating and harvesting are alternately performed simultaneously using two of the first antenna element 101 and second antenna element 102 still at the set duty ratio.

On the other hand, in the case that the sufficient communication speed is not attained when the communication operating and harvesting are alternately performed simultaneously using two of the first antenna element 101 and second antenna element 102 (No in step S203), subsequently, whether or not the duty ratio set at the present point is a setting limit is checked (step S204). In the case that the duty ratio does not reach the setting limit (No in step S204), returning to step S201, the duty ratio of the communication operating is re-set at one higher stage. And after that, subsequently, the communication operating and harvesting are alternately performed simultaneously using two of the first antenna element 101 and second antenna element 102 (step S202).

Moreover, in the case that the communication speed is not sufficient even when the duty ratio reaches the setting limit (Yes in step S204), by transition to the second harvesting mode, the communication operating is performed always using any one antenna of the first antenna element 101 and second antenna element 102 to improve the communication speed (step S205). Or by terminating the harvesting, the communication is performed simultaneously using two of the first antenna element 101 and second antenna element 102 to improve the communication speed. When terminating the harvesting hereafter each of the SPDT switches 103 and 104 is fixed to the terminal on the "1" side.

Figure 3:
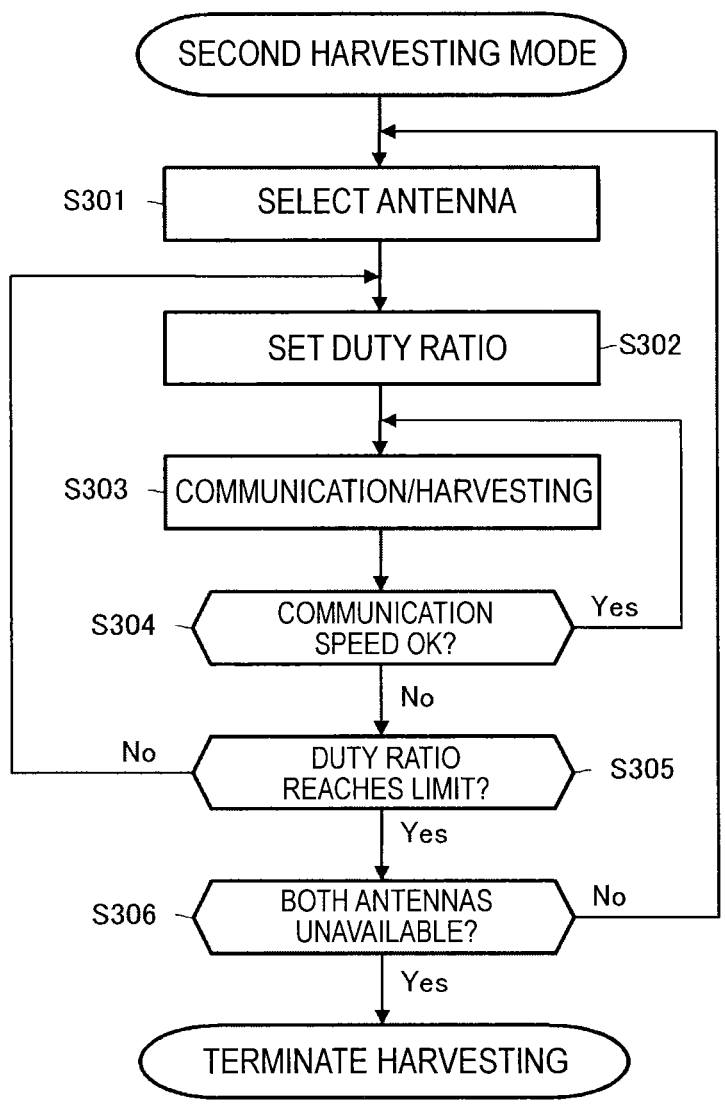
FIG. 3 is a flowchart illustrating an operation procedure in a second harvesting mode of the wireless communication apparatus 100.

FIG. 3 illustrates an operation procedure in the second harvesting mode of the wireless communication apparatus 100 as a form of a flowchart.

At first, any of the first antenna element 101 and second antenna element 102 as to which the switching between the wireless operation and harvesting is performed is selected (step S301). For example, one in which the communication does not have priority out of the first antenna element 101 and second antenna element 102 is selected. Hereinafter, it is supposed that the first antenna element 101 is selected for convenience in the following description.

Next, a duty ratio for enabling the terminal on the "1" side of the SPDT switch 103 is set (step S302). Then, the switching of the SPDT switch 103 in accordance with the set duty ratio is performed. And the communication operating and harvesting are performed alternately as to the first antenna element 101 (step S303).

Upon the enabling of the terminal on the "1" side of the SPDT switch 103, the wireless block 105 performs the communication operating simultaneously using two of the first antenna element 101 and second antenna element 102. Moreover, upon the enabling of the terminal on the "2" side of the SPDT switch 103, the harvesting block 106 performs the harvesting, that is, recovers the electric power from the received signal of the first antenna element 101.

In addition, the communication operating is performed in the MIMO manner during the communication in the second harvesting mode and in an SISO (Single Input Single Output) manner after switching to the harvesting side. Thereby, the communication itself continues.

Next, an average communication speed in a window for a constant time period during the communication operating of the wireless block 105 is measured. Then, whether a sufficient communication speed is attained even when the communication operating and harvesting are alternately performed as to the first antenna element 101 is checked (step S304). Herein, in the case that the sufficient communication speed is attained (Yes in step S304), returning to step S303, the communication operating and harvesting are alternately performed as to the first antenna element 101 still at the set duty ratio.

On the other hand, in the case that the sufficient communication speed is not attained when the communication operating and harvesting are alternately performed as to the first antenna element 101 (No in step S304), subsequently, whether or not the duty ratio set at the present point is a setting limit is checked (step S305). In the case that the duty ratio does not reach the setting limit (No in step S305), returning to step S302, the duty ratio of the communication operating is re-set at one higher stage. And after that, subsequently, the communication operating and harvesting are alternately performed as to the first antenna element 101 (step S303).

Moreover, when the communication speed is not sufficient even in the case that the duty ratio reaches the setting limit (Yes in step S305), whether or not the second antenna element 102, in which the communication has priority, can be selected instead to perform the harvesting is checked (step S306).

When the harvesting can be performed as to the second antenna element 102 (No in step S306), returning to step S301, the switching between the wireless operation and harvesting is performed now by selecting the second antenna element 102 (steps S302 to S305).

When the communication speed is not sufficient even in the case that the second antenna element 102 is selected instead, that is, the antennas are reversed for performing the harvesting (Yes in step S306), terminating the harvesting, the communication is performed simultaneously using two of the first antenna element 101 and second antenna element 102 to improve the communication speed. When terminating the harvesting hereafter each of the SPDT switches 103 and 104 is fixed to the terminal on the "1" side.

Figure 4:
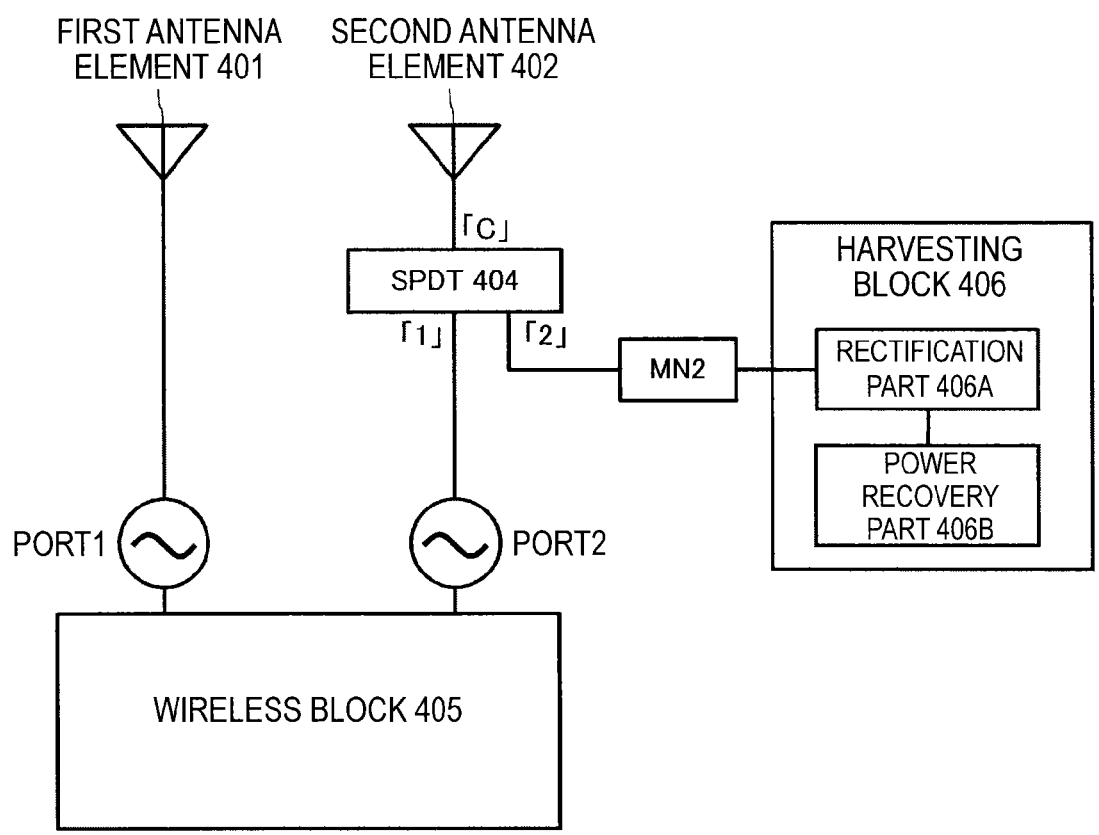
FIG. 4 a diagram schematically illustrating a configuration of a wireless communication apparatus 400 according to a second embodiment of the technology disclosed in the present specification.

Moreover, FIG. 4 schematically illustrates a configuration of a wireless communication apparatus 400 according to a second embodiment of the technology disclosed in the present specification.

The wireless communication apparatus 400 illustrated in the figure includes a diversity antenna including a first antenna element 401 and a second antenna element 402. The first antenna element 401 is connected only to a wireless block 405 and used exclusively for communication. On the other hand, the second antenna element 402 is for both wireless communication and harvesting and is alternatively connected to the wireless block 405 or a harvesting block 406 via an SPDT switch 404. Specifically, the wireless block 405 and the harvesting block 406 are connected to a terminal on a "1" side and a terminal on a "2" side of the SPDT switch 404, respectively. Moreover, an impedance matching part MN2 is inserted between the terminal on the "2" side of the SPDT switch 404 and the harvesting block 106 on each transmission signal line.

The wireless block 405 includes a circuit module performing a wireless operation in a wireless system such as a wireless LAN, WiMAX, WWAN, Bluetooth communication, RFID and WirelessHD. Moreover, the harvesting block 406 includes a rectification part (rectifier and booster) 406A rectifying an input signal and a power recovery part 406B recovering an output from the rectification part 406A as a DC power source.

Upon enabling of the terminal on the "1" side of the SPDT switch 404, transmission power from the wireless block 405 is directly supplied to the second antenna element 402 and a wireless signal is radiated into the air. Moreover, a received signal of the second antenna element 402 is supplied to the wireless block 405 and receiving processing is performed in the wireless block 405. Herein, the first antenna element 401 and second antenna element 402 act as a diversity antenna and are used for the wireless operation in the wireless block 405. On the other hand, upon enabling of the terminal on the "2" side of the SPDT switch 404, the received signal of the second antenna element 402 is, after matching of its impedance in the MN2, inputted to the harvesting block 406 to be rectified and recovered as electric power.

The wireless communication apparatus 400 can recover and use radio waves from a communication destination instrument and/or a peripheral environment preferably, by performing switching of the wireless block 405 and harvesting block 406 connected to the second antenna element 402 in accordance with a communication speed in the wireless block 405.

A harvesting method in the wireless communication apparatus 400 can include a "third harvesting mode" in which the switching between the wireless operation and harvesting is performed only for the second antenna element 402.

Figure 5:
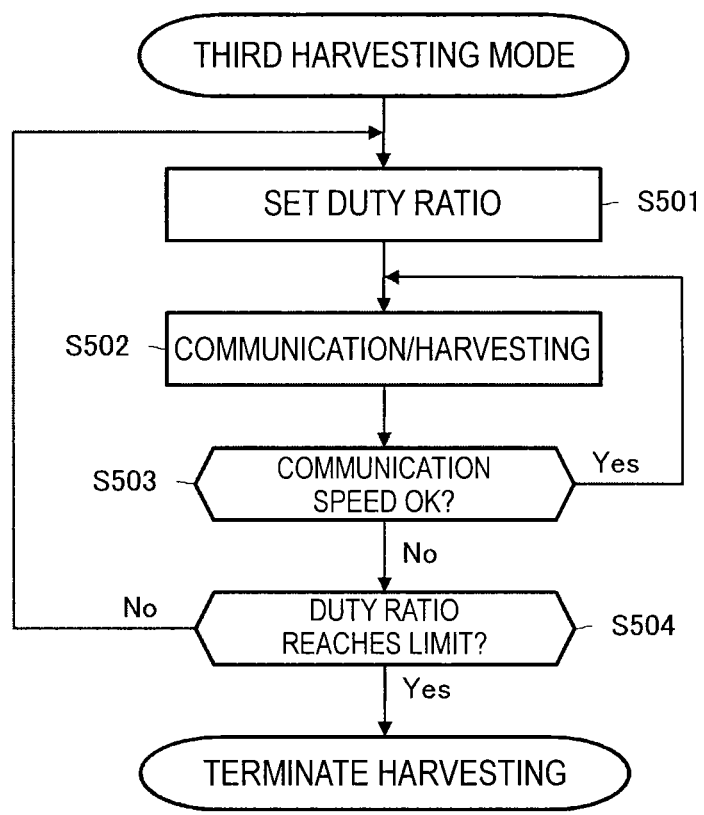
FIG. 5 is a flowchart illustrating an operation procedure in a third harvesting mode of the wireless communication apparatus 400.

FIG. 5 illustrates an operation procedure in the third harvesting mode of the wireless communication apparatus 400 as a form of a flowchart.

At first, a duty ratio for enabling the terminal on the "1" side of the SPDT switch 404 is set (step S501).

Then, the switching of the SPDT switch 404 in accordance with the set duty ratio is performed. And the communication operating and harvesting using the second antenna element 402 are performed alternately (step S502).

Upon the enabling of the terminal on the "1" side of the SPDT switch 404, the wireless block 405 performs the communication operating simultaneously using two of the first antenna element 401 and second antenna element 402. Moreover, upon the enabling of the terminal on the "2" side of each of the SPDT switches 403 and 404, the harvesting block 406 performs the harvesting, that is, recovers the electric power from the received signal of the second antenna element 402.

In addition, the communication operating is performed in the MIMO manner during the communication using the second antenna element 402 and in the SISO manner after switching to the harvesting side. Thereby, the communication itself continues.

Next, an average communication speed in a window for a constant time period during the communication operating of the wireless block 405 is measured. Then, whether a sufficient communication speed is attained even when the communication operating and harvesting are alternately performed using the second antenna element 402 is checked (step S503). Herein, in the case that the sufficient communication speed is attained (Yes in step S503), returning to step S502, the communication operating and harvesting are alternately performed using the second antenna element 402 still at the se duty ratio.

On the other hand, in the case that the sufficient communication speed is not attained when the communication operating and harvesting are alternately performed using the second antenna element 402 (No in step S503), subsequently, whether or not the duty ratio set at the present point is a setting limit is checked (step S504). In the case that the duty ratio does not reach the setting limit (No in step S504), returning to step S501, the duty ratio of the communication operating is re-set at one higher stage. And after that, subsequently, the communication operating and harvesting are alternately performed using the second antenna element 402 (step S502).

Moreover, in the case that the communication speed is not sufficient even when the duty ratio reaches the setting limit (Yes in step S204), by terminating the harvesting, the communication is performed simultaneously using two of the first antenna element 401 and second antenna element 402 to improve the communication speed. When terminating the harvesting hereafter the SPDT switch 404 is fixed to the terminal on the "1" side.

Figure 6:
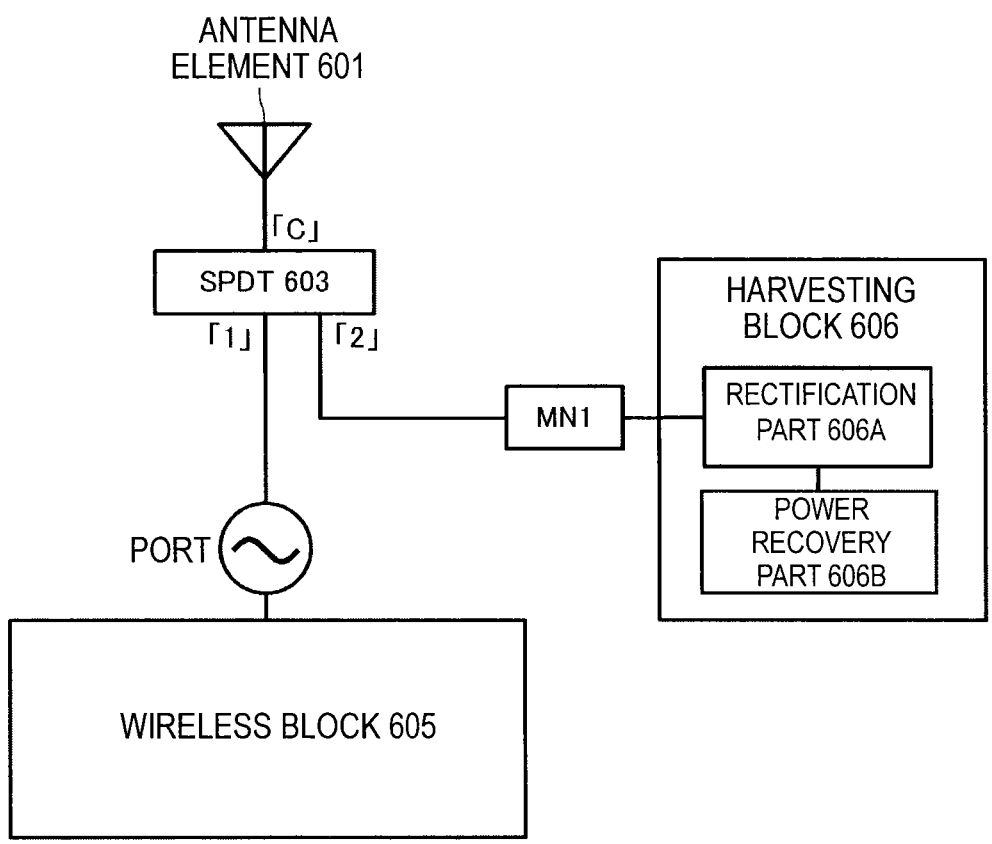
FIG. 6 is a diagram schematically illustrating a configuration of a wireless communication apparatus 600 according to a third embodiment of the technology disclosed in the present specification.

Moreover, FIG. 6 schematically illustrates a configuration of a wireless communication apparatus 600 according to a third embodiment of the technology disclosed in the present specification.

The wireless communication apparatus 600 illustrated in the figure includes only one antenna element 601. The first antenna element 601 is for both wireless communication and harvesting and is alternatively connected to a wireless block 605 or a harvesting block 606 via an SPDT switch 603. Specifically, the wireless block 605 and the harvesting block 606 are connected to a terminal on a "1" side and a terminal on a "2" side of the SPDT switch 603, respectively. Moreover, an impedance matching part MN1 is inserted between the terminal on the "2" side of the SPDT switch 603 and the harvesting block 606 on each transmission signal line.

The wireless block 605 includes a circuit module performing a wireless operation in a wireless system such as a wireless LAN, WiMAX, WWAN, Bluetooth communication, RFID and WirelessHD. Moreover, the harvesting block 606 includes a rectification part (rectifier and booster) 606A rectifying an input signal and a power recovery part 606B recovering an output from the rectification part 606A as a DC power source.

Upon enabling of the terminal on the "1" side of the SPDT switch 603, transmission power from the wireless block 605 is directly supplied to the antenna element 601 and a wireless signal is radiated into the air. Moreover, a received signal of the antenna element 601 is supplied to the wireless block 605 and receiving processing is performed in the wireless block 605. On the other hand, upon enabling of the terminal on the "2" side of the SPDT switch 603, the received signal of the antenna element 601 is, after matching of its impedance in the MN1, inputted to the harvesting block 606 to be rectified and recovered as electric power.

The wireless communication apparatus 600 can recover and use radio waves from a communication destination instrument and/or a peripheral environment preferably by performing switching of the wireless block 605 and harvesting block 606 connected to the antenna element 601 in accordance with a communication speed in the wireless block 605.

A harvesting method in the wireless communication apparatus 600 includes the switching of the wireless operation and harvesting of the antenna element 601 and is similar to the above-mentioned first harvesting mode.

Figure 7:
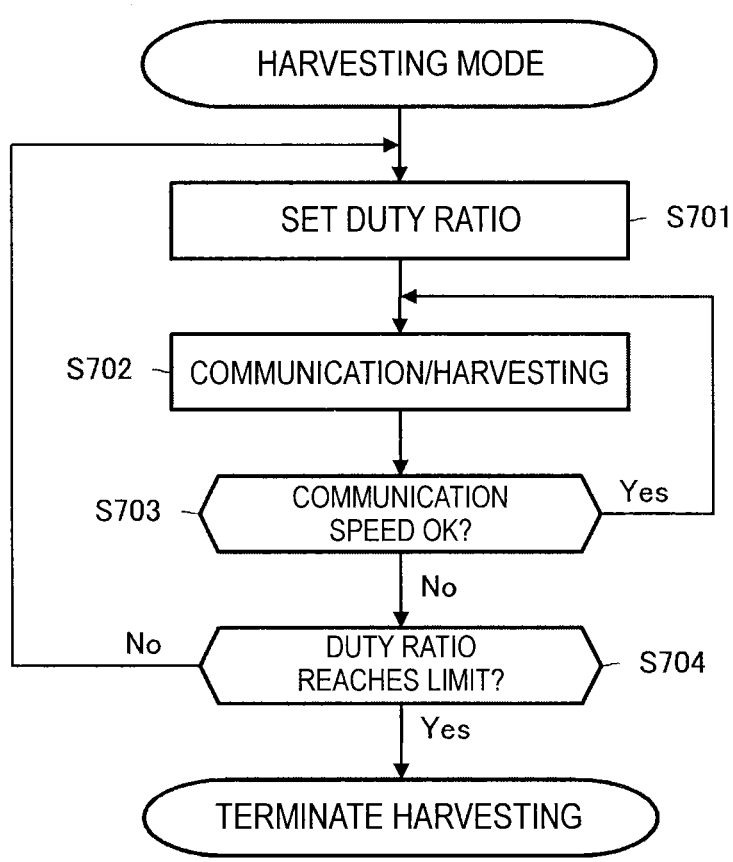
FIG. 7 is a flowchart illustrating an operation procedure in a harvesting mode of the wireless communication apparatus 600.

FIG. 7 illustrates an operation procedure in the harvesting mode of the wireless communication apparatus 600 as a form of a flowchart.

At first, a duty ratio for enabling the terminal on the "1" side of the SPDT switch 603 is set (step S701).

Then, the switching of the SPDT switch 603 in accordance with the set duty ratio is performed. And the communication operating and harvesting using the antenna element 601 are performed alternately (step S702).

Upon the enabling of the terminal on the "1" side of the SPDT switch 603, the wireless block 605 performs the communication operating using the antenna element 601. Moreover, upon the enabling of the terminal on the "2" side of the SPDT switch 603, the harvesting block 606 performs the harvesting, that is, recovers the electric power from the received signal of the antenna element 601.

In addition, during the communication, the communication operating is always performed in the SISO manner. The communication is cut off when the antenna element 601 is switched to the harvesting side.

Next, an average communication speed in a window for a constant time period during the communication operating of the wireless block 605 is measured. Then, whether a sufficient communication speed is attained even when the communication operating and harvesting are alternately performed using the antenna element 601 is checked (step S703). Herein, in the case that the sufficient communication speed is attained (Yes in step S703), returning to step S702, the communication operating and harvesting are alternately performed using the antenna element 601 still at the set duty ratio.

On the other hand, in the case that the sufficient communication speed is not attained when the communication operating and harvesting are alternately performed using the antenna element 601 (No in step S703), subsequently, whether or not the duty ratio set at the present point is a setting limit is checked (step S704). In the case that the duty ratio does not reach the setting limit (No in step S704), returning to step S701, the duty ratio of the communication operating is re-set at one higher stage. And after that, subsequently, the communication operating and harvesting are alternately performed using the antenna element 601 (step S702).

Moreover, even in the case that the duty ratio reaches the setting limit, when the communication speed is not sufficient (Yes in step S704), the harvesting is terminated to improve the communication speed. When terminating the harvesting, hereinafter the SPDT switch 603 is fixed to the terminal on the "1" side.

Figure 8:
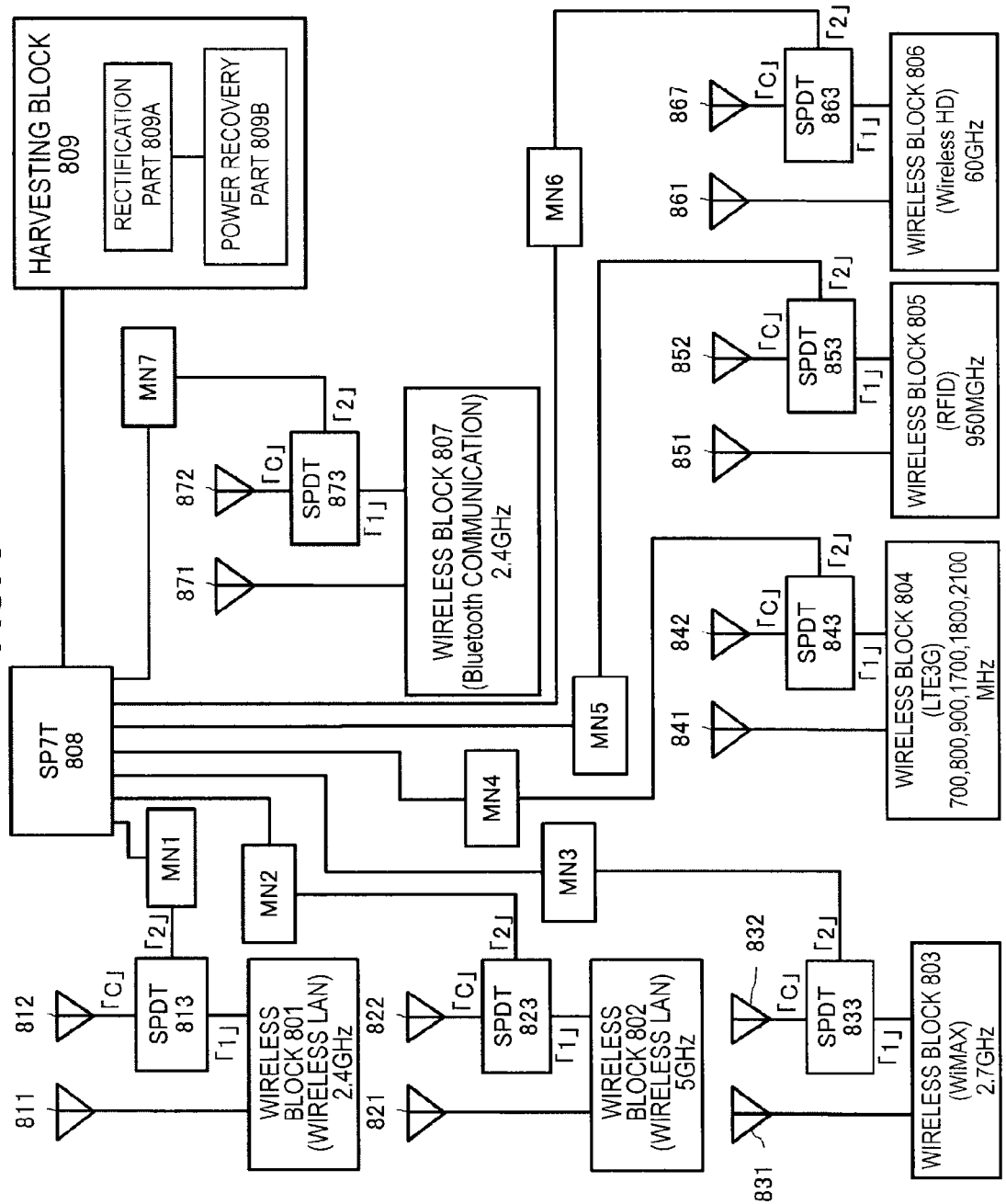
FIG. 8 is a diagram schematically illustrating a configuration of a wireless communication apparatus 800 according to a fourth embodiment of the technology disclosed in the present specification.

Moreover, FIG. 8 schematically illustrates a configuration of a wireless communication apparatus 800 according to a fourth embodiment of the technology disclosed in the present specification.

The wireless communication apparatus 800 illustrated in the figure includes a plurality of wireless blocks 801 to 807 using wireless frequencies different from one another. Generally, as represented by notebook PCs (Personal Computers), one electronic instrument is tending to load a plurality of wireless blocks. Each of the wireless blocks 801 to 807 includes antenna elements for two lines, and one line of them is used exclusively for communication and the other line is used for alternately performing communication operating and harvesting similarly to the embodiment illustrated in FIG. 4.

The first wireless block 801 is a circuit module performing a wireless operation in a wireless LAN system using the 2.4 GHz band. The first wireless block 801 includes antenna elements 811 and 812 for two lines. The one antenna element 811 is directly connected to the first wireless block 801 and used exclusively for communication. The other antenna element 812 is for both wireless communication and harvesting and is alternatively connected to the first wireless block 801 or an SP7T (Single Pole 7 Throw) switch 808 via an SPDT switch 813. Specifically, the first wireless block 801 and a terminal on a "1" side of the SP7T switch 808 are connected to a terminal on a "1" side and a terminal on a "2" side of the SPDT switch 813, respectively. Moreover, an impedance matching part MN1 is inserted between the terminal on the "2" side of the SPDT switch 813 and the SP7T switch 808 on each transmission signal line.

The second wireless block 802 is a circuit module performing a wireless operation in a wireless LAN system using the 5 GHz band. The second wireless block 802 includes antenna elements 821 and 822 for two lines. The one antenna element 821 is directly connected to the second wireless block 802 and used exclusively for communication. The other antenna element 822 is for both wireless communication and harvesting and is alternatively connected to the second wireless block 802 or the SP7T (Single Pole 7 Throw) switch 808 via an SPDT switch 823. Specifically, the second wireless block 802 and a terminal on a "2" side of the SP7T switch 808 are connected to a terminal on a "1" side and a terminal on a "2" side of the SPDT switch 823, respectively. Moreover, an impedance matching part MN2 is inserted between the terminal on the "2" side of the SPDT switch 823 and the SP7T switch 808 on each transmission signal line.

The third wireless block 803 is a circuit module performing a wireless operation in a WiMAX system using the 2.7 GHz band. The third wireless block 803 includes antenna elements 831 and 832 for two lines. The one antenna element 831 is directly connected to the third wireless block 803 and used exclusively for communication. The other antenna element 832 is for both wireless communication and harvesting and is alternatively connected to the third wireless block 803 or the SP7T (Single Pole 7 Throw) switch 808 via an SPDT switch 833. Specifically, the third wireless block 803 and a terminal on a "3" side of the SP7T switch 808 are connected to a terminal on a "1" side and a terminal on a "2" side of the SPDT switch 833, respectively. Moreover, an impedance matching part MN3 is inserted between the terminal on the "2" side of the SPDT switch 833 and the SP7T switch 808 on each transmission signal line.

The fourth wireless block 804 is a circuit module performing a wireless operation in an LTE (Long Term Evolution)/3G system using the 700, 800, 900, 1700, 1800 and 2100 MHz bands. The fourth wireless block 804 includes antenna elements 841 and 842 for two lines. The one antenna element 841 is directly connected to the fourth wireless block 804 and used exclusively for communication. The other antenna element 842 is for both wireless communication and harvesting and is alternatively connected to the fourth wireless block 804 or the SP7T (Single Pole 7 Throw) switch 808 via an SPDT switch 843. Specifically, the fourth wireless block 804 and a terminal on a "4" side of the SP7T switch 808 are connected to a terminal on a "1" side and a terminal on a "2" side of the SPDT switch 843, respectively. Moreover, an impedance matching part MN4 is inserted between the terminal on the "2" side of the SPDT switch 843 and the SP7T switch 808 on each transmission signal line.

The fifth wireless block 805 is a circuit module performing a wireless operation in an RFID system using the 950 MHz band. The fifth wireless block 805 includes antenna elements 851 and 852 for two lines. The one antenna element 851 is directly connected to the fifth wireless block 805 and used exclusively for communication. The other antenna element 852 is for both wireless communication and harvesting and is alternatively connected to the fifth wireless block 805 or the SP7T (Single Pole 7 Throw) switch 808 via an SPDT switch 853. Specifically, the fifth wireless block 805 and a terminal on a "5" side of the SP7T switch 808 are connected to a terminal on a "1" side and a terminal on a "2" side of the SPDT switch 853, respectively. Moreover, an impedance matching part MN5 is inserted between the terminal on the "2" side of the SPDT switch 853 and the SP7T switch 808 on each transmission signal line.

The sixth wireless block 806 is a circuit module performing a wireless operation in a WirelessHD system using the 60 GHz band. The sixth wireless block 806 includes antenna elements 861 and 862 for two lines. The one antenna element 861 is directly connected to the sixth wireless block 806 and used exclusively for communication. The other antenna element 862 is for both wireless communication and harvesting and is alternatively connected to the sixth wireless block 806 or the SP7T (Single Pole 7 Throw) switch 808 via an SPDT switch 863. Specifically, the sixth wireless block 806 and a terminal on a "6" side of the SP7T switch 808 are connected to a terminal on a "1" side and a terminal on a "2" side of the SPDT switch 863, respectively. Moreover, an impedance matching part MN6 is inserted between the terminal on the "2" side of the SPDT switch 863 and the SP7T switch 808 on each transmission signal line.

The seventh wireless block 807 is a circuit module performing a wireless operation in a Bluetooth communication system using the 2.4 GHz band (or other wireless communication systems). The seventh wireless block 807 includes antenna elements 871 and 872 for two lines. The one antenna element 871 is directly connected to the seventh wireless block 807 and used exclusively for communication. The other antenna element 872 is for both wireless communication and harvesting and is alternatively connected to the seventh wireless block 807 or the SP7T (Single Pole 7 Throw) switch 808 via an SPDT switch 873. Specifically, the seventh wireless block 807 and a terminal on a "7" side of the SP7T switch 808 are connected to a terminal on a "1" side and a terminal on a "2" side of the SPDT switch 873, respectively. Moreover, an impedance matching part MN7 is inserted between the terminal on the "2" side of the SPDT switch 873 and the SP7T switch 808 on each transmission signal line.

A harvesting block 809 is connected to a single pole of the SP7T switch 808. The harvesting block 809 includes a rectification part 809A rectifying an input signal and a power recovery part 809B recovering an output from the rectification part 809A as a DC power source.

Upon enabling of the terminal on the "2" side of the SPDT switch 813 and concomitantly the terminal on the "1" side of the SP7T switch 808, the first wireless block 801 performs wireless communication operating in the SISO manner only using the one antenna element 811. Moreover, a received signal of the other antenna element 812 is, after matching of its impedance in the MN1, inputted to the harvesting block 809 to be rectified and recovered as electric power. On the other hand, upon enabling of the terminal on the "1" side of the SPDT switch 813, the first wireless block 801 performs the wireless communication operating in the MIMO manner simultaneously using two of the antenna elements 811 and 812. In the both cases, the communication operating itself of the first wireless block 801 continues.

Upon enabling of the terminal on the "2" side of the SPDT switch 823 and concomitantly the terminal on the "2" side of the SP7T switch 808, the second wireless block 802 performs wireless communication operating in the SISO manner only using the one antenna element 821. Moreover, a received signal of the other antenna element 822 is, after matching of its impedance in the MN2, inputted to the harvesting block 809 to be rectified and recovered as the electric power. On the other hand, upon enabling of the terminal on the "1" side of the SPDT switch 823, the second wireless block 802 performs the wireless communication operating in the MIMO manner simultaneously using two of the antenna elements 821 and 822. In the both cases, the communication operating itself of the second wireless block 802 continues.

Upon enabling of the terminal on the "2" side of the SPDT switch 833 and concomitantly the terminal on the "3" side of the SP7T switch 808, the third wireless block 803 performs wireless communication operating in the SISO manner only using the one antenna element 831. Moreover, a received signal of the other antenna element 832 is, after matching of its impedance in the MN3, inputted to the harvesting block 809 to be rectified and recovered as the electric power. On the other hand, upon enabling of the terminal on the "1" side of the SPDT switch 833, the third wireless block 803 performs the wireless communication operating in the MIMO manner simultaneously using two of the antenna elements 831 and 832. In the both cases, the communication operating itself of the third wireless block 803 continues.

Upon enabling of the terminal on the "2" side of the SPDT switch 843 and concomitantly the terminal on the "4" side of the SP7T switch 808, the fourth wireless block 804 performs wireless communication operating in the SISO manner only using the one antenna element 841. Moreover, a received signal of the other antenna element 842 is, after matching of its impedance in the MN4, inputted to the harvesting block 809 to be rectified and recovered as the electric power. On the other hand, upon enabling of the terminal on the "1" side of the SPDT switch 843, the fourth wireless block 804 performs the wireless communication operating in the MIMO manner simultaneously using two of the antenna elements 841 and 842. In the both cases, the communication operating itself of the fourth wireless block 804 continues.

Upon enabling of the terminal on the "2" side of the SPDT switch 853 and concomitantly the terminal on the "5" side of the SP7T switch 808, the fifth wireless block 805 performs wireless communication operating in the SISO manner only using the one antenna element 851. Moreover, a received signal of the other antenna element 852 is, after matching of its impedance in the MN5, inputted to the harvesting block 809 to be rectified and recovered as the electric power. On the other hand, upon enabling of the terminal on the "1" side of the SPDT switch 853, the fifth wireless block 805 performs the wireless communication operating in the MIMO manner simultaneously using two of the antenna elements 851 and 852. In the both cases, the communication operating itself of the fifth wireless block 805 continues.

Upon enabling of the terminal on the "2" side of the SPDT switch 863 and concomitantly the terminal on the "6" side of the SP7T switch 808, the sixth wireless block 806 performs wireless communication operating in the SISO manner only using the one antenna element 861. Moreover, a received signal of the other antenna element 862 is, after matching of its impedance in the MN6, inputted to the harvesting block 809 to be rectified and recovered as the electric power. On the other hand, upon enabling of the terminal on the "1" side of the SPDT switch 863, the sixth wireless block 806 performs the wireless communication operating in the MIMO manner simultaneously using two of the antenna elements 861 and 862. In the both cases, the communication operating itself of the sixth wireless block 806 continues.

Upon enabling of the terminal on the "2" side of the SPDT switch 873 and concomitantly the terminal on the "7" side of the SP7T switch 808, the seventh wireless block 807 performs wireless communication operating in the SISO manner only using the one antenna element 871. Moreover, a received signal of the other antenna element 872 is, after matching of its impedance in the MN7, inputted to the harvesting block 809 to be rectified and recovered as the electric power. On the other hand, upon enabling of the terminal on the "1" side of the SPDT switch 873, the seventh wireless block 807 performs the wireless communication operating in the MIMO manner simultaneously using two of the antenna elements 871 and 872. In the both cases, the communication operating itself of the seventh wireless block 807 continues.

In addition, although the terminal on the "2" side of each of the SPDT switches 813, 823, . . . and 873 and concomitantly the corresponding terminal of the SP7T switch 808 are enabled in the above, the terminals corresponding to each other have not always been enabled simultaneously. The wireless block for which the harvesting is to be performed is selected using RSSIs of the individual wireless blocks 801 to 807 as an evaluation basis as follows, and the terminal of the SP7T switch 808 corresponding to the selected wireless block is previously enabled. Moreover, any of the individual wireless blocks 801 to 807 includes the antenna configuration similar to that of the wireless communication apparatus 400 illustrated in FIG. 4. Therefore, the harvesting may be performed by the switching of the SPDT switch at the duty ratio at which the sufficient communication speed can be attained by the operating, for example, in accordance with the operation procedure in the third harvesting mode illustrated in FIG. 5.

Accordingly, the wireless communication apparatus 800 can determine and select the largest in received signal strength (Received Signal Strength Indication) from among the plurality of wireless blocks 801 to 807 and can recover and use radio waves preferably.

Figure 9:
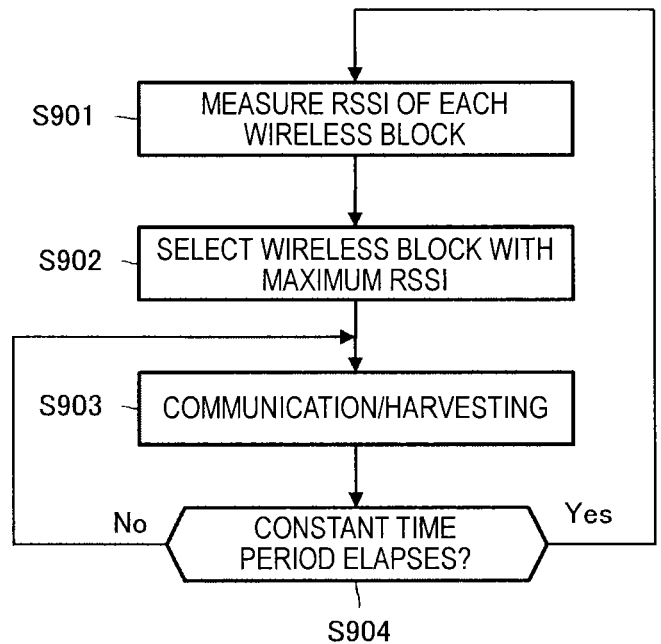
FIG. 9 is a flowchart illustrating an operation procedure when the wireless communication apparatus 800 performs harvesting.

FIG. 9 illustrates an operation procedure when the wireless communication apparatus 800 performs the harvesting as a form of a flowchart.

For example, periodically (Yes in step S904), the RSSIs of the individual wireless blocks 801 to 807 are measured (step S901). Then, the wireless block with the maximum RSSI is selected (step S902) and the harvesting is performed (step S903). The harvesting is performed by the enabling of the terminal on the "2" side of the SPDT switch for the selected wireless block and concomitantly the corresponding terminal of the SP7T switch 808.

The wireless block selected in step S902 performs the switching of the SPDT switch, for example, in accordance with the operation procedure in the third harvesting mode illustrated in FIG. 5 to perform the harvesting in step S903. Or the selected wireless block may fix the terminal on the "2" side of the SPDT switch to the enable state to perform the harvesting continuously during the time period when selected.

Figure 10:
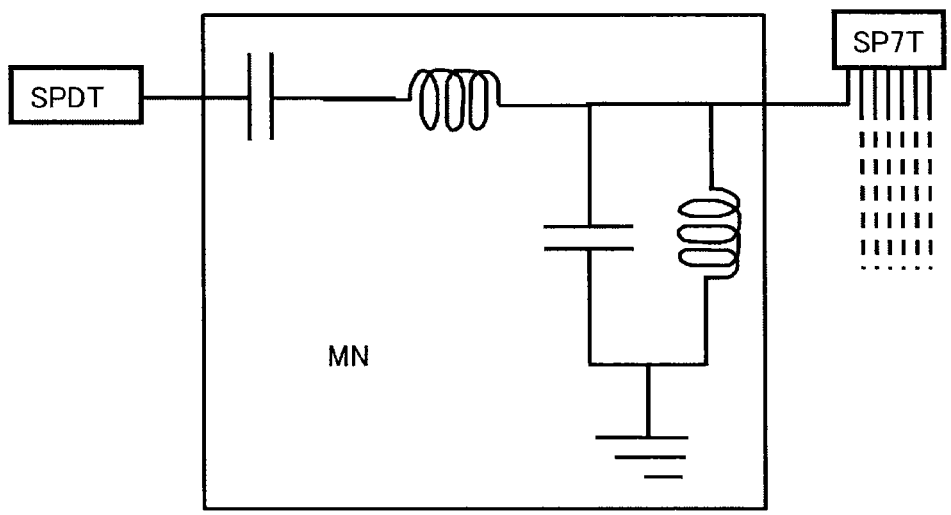
FIG. 10 is a diagram illustrating an example of a configuration of an impedance matching part.

FIG. 10 illustrates an example of a configuration of the impedance matching parts MN1 to MN7 disposed between the antennas 812, 822, . . . and 872 sides (SPDTs) and the SPIT switch 808. The impedance matching part is formed as a combination of LC-series resonance and parallel resonance as illustrated in the figure, or any one of them, or an L or C independently, or the like in accordance with characteristics.

In the wireless communication apparatus 800 illustrated in FIG. 8, the wireless blocks 801 to 807, which use the wireless frequencies different from one another, share the single harvesting block 809. Accordingly, constants for the individual impedance matching parts MN1 to MN7 should be determined so that differences between the used frequencies can be absorbed.

Figure 11:
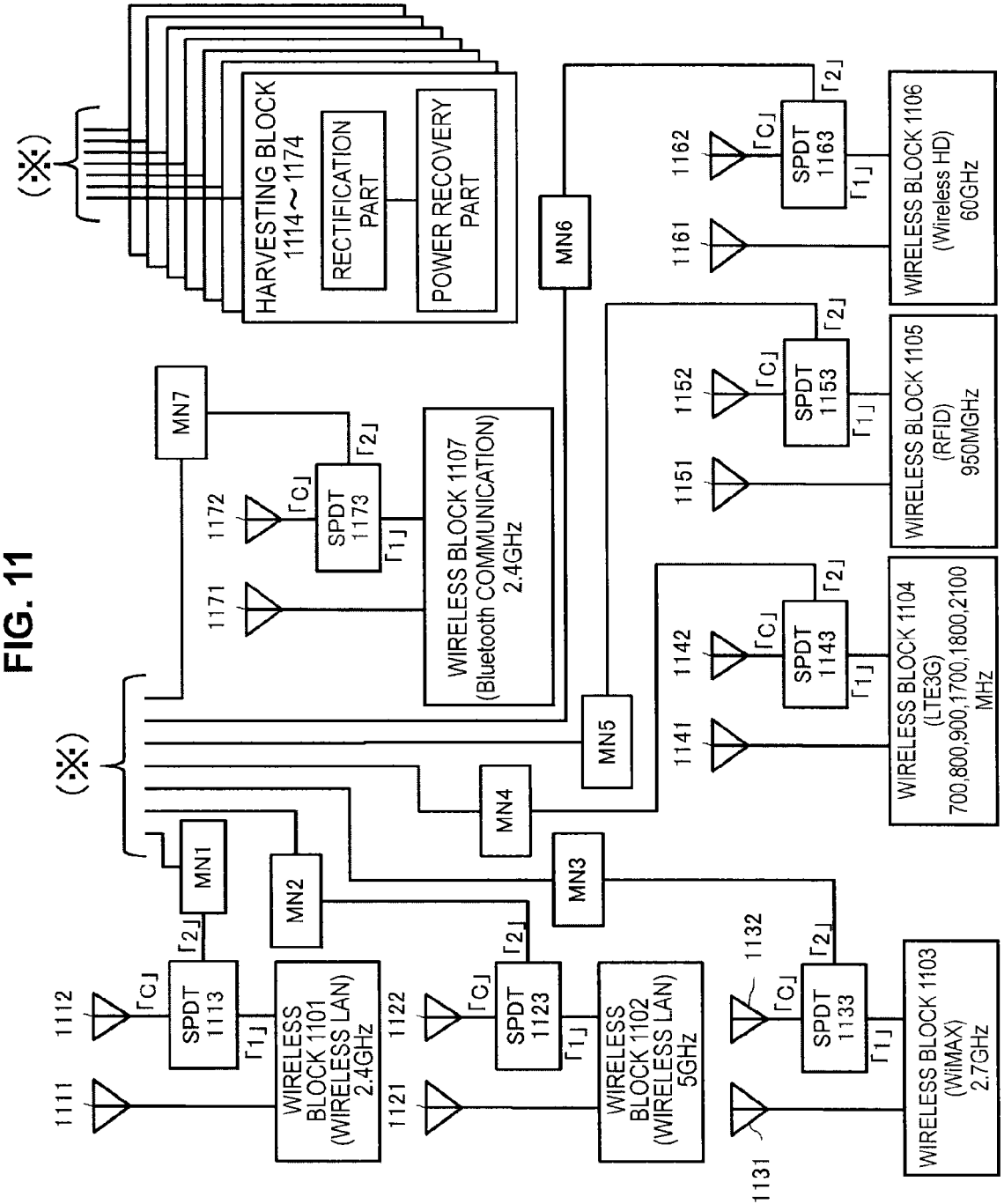
FIG. 11 is a diagram schematically illustrating a configuration of a wireless communication apparatus 1100 according to a fifth embodiment of the technology disclosed in the present specification.

FIG. 11 schematically illustrates a configuration of a wireless communication apparatus 1100 according to a fifth embodiment of the technology disclosed in the present specification.

The wireless communication apparatus 1100 illustrated in the figure includes a plurality of wireless blocks 1101 to 1107 using wireless frequencies different from one another similarly to the wireless communication apparatus 800 illustrated in FIG. 8. Moreover, each of the wireless blocks 1101 to 1107 includes antenna elements for two lines. One line of them is used exclusively for communication, and meanwhile, the other line is used for alternately performing communication operating and harvesting similarly to the embodiment illustrated in FIG. 4.

The first wireless block 1101 is a circuit module performing a wireless operation in a wireless LAN system using the 2.4 GHz band. One antenna element 1111 is directly connected to the first wireless block 1101 and used exclusively for communication. The other antenna element 1112 is alternatively connected to the first wireless block 1101 or its own harvesting block 1114 via an SPDT switch 1113. Specifically, the first wireless block 1101 and the harvesting block 1114 are connected to a terminal on a "1" side and a terminal on a "2" side of the SPDT switch 1113, respectively. Moreover, an impedance matching part MN1 is inserted between the terminal on the "2" side of the SPDT switch 1113 and the harvesting block 1114 on each transmission signal line.

The second wireless block 1102 is a circuit module performing a wireless operation in a wireless LAN system using the 5 GHz band. One antenna element 1121 is directly connected to the second wireless block 1102 and used exclusively for communication. The other antenna element 1122 is alternatively connected to the second wireless block 1102 or its own harvesting block 1124 via an SPDT switch 1123. Specifically, the second wireless block 1102 and the harvesting block 1124 are connected to a terminal on a "1" side and a terminal on a "2" side of the SPDT switch 1123, respectively. Moreover, an impedance matching part MN2 is inserted between the terminal on the "2" side of the SPDT switch 1123 and the harvesting block 1124 on each transmission signal line.

The third wireless block 1103 is a circuit module performing a wireless operation in a WiMAX system using the 2.7 GHz band. One antenna element 1131 is directly connected to the third wireless block 1103 and used exclusively for communication. The other antenna element 1132 is alternatively connected to the third wireless block 1103 or its own harvesting block 1134 via an SPDT switch 1133. Specifically, the third wireless block 1103 and the harvesting block 1134 are connected to a terminal on a "1" side and a terminal on a "2" side of the SPDT switch 1133, respectively. Moreover, an impedance matching part MN3 is inserted between the terminal on the "2" side of the SPDT switch 1133 and the harvesting block 1134 on each transmission signal line.

The fourth wireless block 1104 is a circuit module performing a wireless operation in an LTE (Long Term Evolution)/3G system using the 700, 800, 900, 1700, 1800 and 2100 MHz bands. One antenna element 1141 is directly connected to the fourth wireless block 1104 and used exclusively for communication. The other antenna element 1142 is alternatively connected to the fourth wireless block 1104 or its own harvesting block 1144 via an SPDT switch 1143. Specifically, the fourth wireless block 1104 and the harvesting block 1144 are connected to a terminal on a "1" side and a terminal on a "2" side of the SPDT switch 1143, respectively. Moreover, an impedance matching part MN4 is inserted between the terminal on the "2" side of the SPDT switch 1143 and the harvesting block 1144 on each transmission signal line.

The fifth wireless block 1105 is a circuit module performing a wireless operation in an RFID system using the 950 MHz band. One antenna element 1151 is directly connected to the fifth wireless block 1105 and used exclusively for communication. The other antenna element 1152 is alternatively connected to the fifth wireless block 1105 or its own harvesting block 1154 via an SPDT switch 1153. Specifically, the fifth wireless block 1105 and the harvesting block 1154 are connected to a terminal on a "1" side and a terminal on a "2" side of the SPDT switch 1153, respectively. Moreover, an impedance matching part MN5 is inserted between the terminal on the "2" side of the SPDT switch 1153 and the harvesting block 1154 on each transmission signal line.

The sixth wireless block 1106 is a circuit module performing a wireless operation in a WirelessHD system using the 60 GHz band. One antenna element 1161 is directly connected to the sixth wireless block 1106 and used exclusively for communication. The other antenna element 1162 is alternatively connected to the sixth wireless block 1106 or its own harvesting block 1164 via an SPDT switch 1163. Specifically, the sixth wireless block 1106 and the harvesting block 1164 are connected to a terminal on a "1" side and a terminal on a "2" side of the SPDT switch 1163, respectively. Moreover, an impedance matching part MN6 is inserted between the terminal on the "2" side of the SPDT switch 1163 and the harvesting block 1164 on each transmission signal line.

The seventh wireless block 1107 is a circuit module performing a wireless operation in a Bluetooth communication system using the 2.4 GHz band (or other wireless communication systems). One antenna element 1171 is directly connected to the seventh wireless block 1107 and used exclusively for communication. The other antenna element 1172 is alternatively connected to the seventh wireless block 1107 or its own harvesting block 1174 via an SPDT switch 1173. Specifically, the seventh wireless block 1107 and its own harvesting block 1174 are connected to a terminal on a "1" side and a terminal on a "2" side of the SPDT switch 1173, respectively. Moreover, an impedance matching part MN7 is inserted between the terminal on the "2" side of the SPDT switch 1173 and its own harvesting block 1174 on each transmission signal line.

In the wireless communication apparatus 800 illustrated in FIG. 8, any one of the wireless blocks is selected by the SPIT switch 808 and the harvesting is alternatively performed. In contrast, in the wireless communication apparatus 1100 illustrated in FIG. 11, the number of wireless blocks performing the harvesting is not limited particularly. Namely, in each of the wireless blocks 1101 to 1107, the harvesting can individually be performed by the switching of the SPDT switch at the duty ratio at which the sufficient communication speed can be attained by the operating in accordance with the operation procedure in the third harvesting mode as illustrated in FIG. 5.

Additionally, the technology disclosed in the present specification may also be configured as below.

(1) A wireless communication apparatus including:
  at least one two-way antenna for power recovery;
  a wireless block processing a wireless signal which the two-way antenna for power recovery transmits and receives;
  a power recovery block recovering electric power from a received signal of the two-way antenna for power recovery; and
  a connection switching part connecting the two-way antenna for power recovery to and switching the connection between the wireless block and the power recovery block, wherein
  a duty ratio at which the connection switching part connects the two-way antenna for power recovery to the wireless block and the power recovery block is set so that the wireless block attains a desired communication speed.

(2) The wireless communication apparatus according to (1), wherein the connection switching part fixes the connection of the two-way antenna for power recovery to the wireless block when the wireless block does not attain the desired communication speed even at a setting limit of the duty ratio.

(3) The wireless communication apparatus according to (1), wherein plural two-way antennas for power recovery are provided.

(4) The wireless communication apparatus according to (3), wherein the number of the plural two-way antennas for power recovery the connection of which the connection switching part fixes to the wireless block is increased stepwise when the wireless block does not attain the desired communication speed even at a setting limit of the duty ratio.

(5) The wireless communication apparatus according to (4), wherein an antenna the connection of which the connection switching part fixes to the wireless block from among the plural two-way antennas for power recovery is changed when the wireless block does not attain the desired communication speed even at the setting limit of the duty ratio.

(6) The wireless communication apparatus according to (3), wherein the wireless block performs communication processing in an MIMO manner when the connection switching part connects the plural two-way antennas for power recovery to the wireless block, performs the communication processing in an SISO manner when only one of the two-way antennas for power recovery is connected to the wireless block, and terminates the communication processing when no two-way antennas for power recovery are connected to the wireless block.

(7) The wireless communication apparatus according to (1), further including:
  at least one antenna exclusively for communication directly connected to the wireless block not via the connection switching part.

(8) The wireless communication apparatus according to (7), wherein the connection switching part fixes the connection of the two-way antenna for power recovery to the wireless block when the wireless block does not attain the desired communication speed even at a setting limit of the duty ratio.

(9) The wireless communication apparatus according to (7), wherein the wireless block performs communication processing in an MIMO manner concomitantly using the antenna exclusively for communication when the connection switching part connects at least one of the two-way antennas for power recovery to the wireless block, and performs the communication processing in an SISO manner when only one antenna exclusively for communication is connected to the wireless block.

(10) A wireless communication apparatus including:
  a plurality of wireless blocks each including a two-way antenna for power recovery and processing a wireless signal which the two-way antenna for power recovery transmits and receives;
  a power recovery block recovering electric power from a received signal of the two-way antenna for power recovery which each of the wireless blocks includes; and
  a selection part selecting the wireless block whose two-way antenna for power recovery is used to recover the electric power in the power recovery block.

(11) The wireless communication apparatus according to (10), wherein the plurality of wireless blocks use wireless frequencies different from one another.

(12) The wireless communication apparatus according to (10), wherein the selection part selects the wireless block whose two-way antenna for power recovery is used to recover the electric power in the power recovery block based on received signal strengths of the respective plurality of wireless blocks.

(13) The wireless communication apparatus according to (10), wherein each of the plurality of wireless blocks includes a connection switching part connecting its own two-way antenna for power recovery to and switching the connection between the wireless block and the power recovery block via the selection part.

(14) The wireless communication apparatus according to (13), wherein a duty ratio at which the connection switching part connects the two-way antenna for power recovery to the wireless block and the power recovery block is set so that the wireless block selected by the selection part attains a desired communication speed.

(15) The wireless communication apparatus according to (14), wherein the connection switching part fixes the connection of the two-way antenna for power recovery to the wireless block when the wireless block selected by the selection part does not attain the desired communication speed even at a setting limit of the duty ratio.

(16) The wireless communication apparatus according to (10), wherein at least part of the plurality of wireless blocks each further includes at least one antenna exclusively for communication directly connected to itself not via the connection switching part.

(17) A wireless communication apparatus including:
  a plurality of wireless blocks each processing a wireless signal;
  a two-way antenna for power recovery provided in each of the plurality of wireless blocks;
  a power recovery block recovering electric power from a received signal of the two-way antenna for power recovery which each of the wireless blocks includes; and
  a connection switching part provided in each of the plurality of wireless blocks, and connecting the two-way antenna for power recovery to and switching the connection between the wireless block and the power recovery block.

(18) The wireless communication apparatus according to (17), wherein each of the plurality of wireless blocks includes a connection switching part connecting its own two-way antenna for power recovery to and switching the connection between the wireless block and the power recovery block via the connection switching part.

(19) The wireless communication apparatus according to (17), wherein the connection switching part provided in each of the plurality of wireless blocks sets a duty ratio at which the two-way antenna for power recovery is connected to the wireless block and the power recovery block so that the wireless block attains a desired communication speed.

(20) The wireless communication apparatus according to (19), wherein the connection switching part provided in each of the plurality of wireless blocks fixes the connection of the two-way antenna for power recovery to the wireless block when the desired communication speed is not attained even at a setting limit of the duty ratio.

(21) The wireless communication apparatus according to (17), wherein at least part of the plurality of wireless blocks each further includes at least one antenna exclusively for communication directly connected to itself not via the connection switching part.

(22) Electronic equipment including:
  at least one two-way antenna for power recovery;
  a wireless block processing a wireless signal which the two-way antenna for power recovery transmits and receives;
  a power recovery block recovering electric power from a received signal of the two-way antenna for power recovery; and
  a connection switching part connecting the two-way antenna for power recovery to and switching the connection between the wireless block and the power recovery block, wherein
  a duty ratio at which the connection switching part connects the two-way antenna for power recovery to the wireless block and the power recovery block is set so that the wireless block attains a desired communication speed.

(23) Electronic equipment including:
  a plurality of wireless blocks each including a two-way antenna for power recovery and processing a wireless signal which the two-way antenna for power recovery transmits and receives;
  a power recovery block recovering electric power from a received signal of the two-way antenna for power recovery which each of the wireless blocks includes; and a selection part selecting the wireless block whose two-way antenna for power recovery is used to recover the electric power in the power recovery block.

(24) Electronic equipment including:

a plurality of wireless blocks each processing a wireless signal;

a two-way antenna for power recovery provided in each of the plurality of wireless blocks;

a power recovery block recovering electric power from a received signal of the two-way antenna for power recovery which each of the wireless blocks includes; and a connection switching part provided in each of the plurality of wireless blocks, and connecting the two-way antenna for power recovery to and switching the connection between the wireless block and the power recovery block.

It should be understood by those skilled in the art that various modifications, combinations, sub-combinations and alterations may occur depending on design requirements and other factors insofar as they are within the scope of the appended claims or the equivalents thereof.

As above, the technology disclosed in the present specification has been described in detail with reference to the specific embodiments, whereas it is apparent to those skilled in the art that modifications and substitutions of the embodiments can be made without departing from the spirit and scope of the technology disclosed in the present specification.

The technology disclosed in the present specification can be applied to information terminals such as an electronic book, notebook PC, tablet and communicator. Energy resources of spatial radio waves can be effectively utilized by the switching of the operation between the communication and the harvesting in response to usage of the information terminal or the like. Moreover, under the circumstances that the information terminal is close to access points and/or base stations, the far greater effect of the power recovery is expected.

In short, the present technology has been disclosed in the form of exemplification, and therefore, the description of the present specification should not be construed limitedly. In order fully to understand the spirit and scope of the present technology, reference should be made to the appended claims.

The present disclosure contains subject matter related to that disclosed in Japanese Priority Patent Application JP 2011-170740 filed in the Japan Patent Office on Aug. 4, 2011 the entire content of which is hereby incorporated by reference.

What is claimed is:

1. A wireless communication apparatus, comprising:
a two-way antenna;
a wireless circuit configured to process wireless signals which the two-way antenna transmits and receives;
a power recovery circuit configured to recover electric power from a received signal of the two-way antenna; and
a connection switching circuit configured to connect the two-way antenna to one of the wireless circuit and the power recovery circuit, switch the connection of the two-way antenna between the wireless circuit and the power recovery circuit, and set a duty ratio at which the connection switching circuit connects the two-way antenna to the wireless circuit and the power recovery circuit to attain a desired communication speed, the duty ratio being re-set at a higher stage by comparing the duty ratio with a setting limit of duty ratio to determine whether the duty ratio reaches the setting limit in an event the communication speed is below a predefined threshold speed.

2. The wireless communication apparatus according to claim 1, wherein the connection switching circuit is configured to fix the connection of the two-way antenna to the wireless circuit in an event the wireless circuit does not attain the desired communication speed even at the setting limit of the duty ratio.

3. The wireless communication apparatus according to claim 1, further comprising a plurality of two-way antennas, the plurality including the two-way antenna.

4. The wireless communication apparatus according to claim 3, wherein the number of the plurality of two-way antennas the connection of which the connection switching circuit fixes to the wireless circuit is increased stepwise in an event the wireless circuit does not attain the desired communication speed even at the setting limit of the duty ratio.

5. The wireless communication apparatus according to claim 4, wherein an antenna the connection of which the connection switching circuit fixes to the wireless circuit from among the plurality of two-way antennas is changed in an event the wireless circuit does not attain the desired communication speed even at the setting limit of the duty ratio.

6. The wireless communication apparatus according to claim 3, wherein the wireless circuit is configured to:
perform communication processing in an MIMO manner in an event the connection switching circuit connects the plurality of two-way antennas to the wireless circuit;
perform the communication processing in an SISO manner in an event only one of the two-way antennas is connected to the wireless circuit; and
terminate the communication processing in an event no two-way antennas are connected to the wireless circuit.

7. The wireless communication apparatus according to claim 1, further comprising:
at least one antenna exclusively for communication directly connected to the wireless circuit not via the connection switching circuit.

8. The wireless communication apparatus according to claim 7, wherein the connection switching circuit is configured to fix the connection of the two-way antenna to the wireless circuit in an event the wireless circuit does not attain the desired communication speed even at the setting limit of the duty ratio.

9. The wireless communication apparatus according to claim 7, wherein the wireless circuit is configured to:
perform communication processing in an MIMO manner concomitantly using the antenna exclusively for communication in an event the connection switching circuit connects at least one of the two-way antennas to the wireless circuit; and
perform the communication processing in an SISO manner in case only one antenna exclusively for communication is connected to the wireless circuit.

10. A wireless communication apparatus, comprising:
a plurality of wireless circuits each of which includes a two-way antenna, wherein each of the plurality of wireless circuits is configured to process wireless signals which the respective two-way antenna transmits and receives;
a power recovery circuit configured to recover electric power from a received signal of the two-way antenna which each of the plurality of wireless circuits includes;

a selection circuit configured to select a particular wireless circuit including a particular two-way antenna that recovers the electric power in the power recovery circuit; and a connection switching circuit configured to connect the particular wireless circuit to the particular two-way antenna, and switch the connection of the particular two-way antenna between the particular wireless circuit and the power recovery circuit, and set a duty ratio at which the connection switching circuit connects the particular two-way antenna to the particular wireless circuit and the power recovery circuit to attain a desired communication speed, the duty ratio being re-set at a higher stage by comparing the duty ratio with a setting limit of duty ratio to determine whether the duty ratio reaches the setting limit in an event the communication speed is below a threshold speed.

11. The wireless communication apparatus according to claim 10, wherein the plurality of wireless circuits each use wireless frequencies different from one another.

12. The wireless communication apparatus according to claim 10, wherein each of the plurality of wireless circuits includes the connection switching circuit which connects each of the plurality of wireless circuits to the respective two-way antenna, and switches the connection between each of the plurality of wireless circuits and the power recovery circuit via the selection circuit.

13. The wireless communication apparatus according to claim 10, wherein the connection switching circuit is configured to fix the connection of the particular two-way antenna to the particular wireless circuit, in an event the particular wireless circuit does not attain the desired communication speed even at the setting limit of the duty ratio.

14. The wireless communication apparatus according to claim 10, wherein at least part of the plurality of wireless circuits each further includes at least one antenna exclusively for communication directly connected to itself not via the connection switching circuit.

15. A wireless communication apparatus comprising:
a plurality of wireless circuits each of which is configured to process a wireless signal;
a plurality of two-way antennas, each two-way antenna corresponding to a different wireless circuit;
a power recovery circuit configured to recover electric power from signals received by the two-way antennas; and
a plurality of connection switching circuits, each connection switching circuit corresponding to a different wireless circuit, wherein each connection switching circuit is configured to connect the corresponding two-way antenna to one of the corresponding wireless circuit and the power recovery circuit, switch the connection of the corresponding two-way antenna between the corresponding wireless circuit and the power recovery circuit, and set a duty ratio at which the connection switching circuit connects the corresponding two-way antenna to the corresponding wireless circuit and the power recovery circuit to attain a desired communication speed, the duty ratio being re-set at a higher stage by comparing the duty ratio with a setting limit of duty ratio to determine whether the duty ratio reaches the setting limit in an event the communication speed is below a predefined threshold speed.

16. The wireless communication apparatus according to claim 15, wherein the connection switching circuit corresponding to each of the plurality of wireless circuits is configured to set a duty ratio at which the corresponding two-way antenna is connected to the wireless circuit and the power recovery circuit so that the wireless circuit attains a desired communication speed.

17. The wireless communication apparatus according to claim 16, wherein the connection switching circuit corresponding to each of the plurality of wireless circuits is configured to fix the connection of the corresponding two-way antenna to the wireless circuit in an event the desired communication speed is not attained even at the setting limit of the duty ratio.

18. The wireless communication apparatus according to claim 15, wherein at least part of the plurality of wireless circuits each further includes at least one antenna exclusively for communication directly connected to itself not via the connection switching circuit.

19. Electronic equipment comprising:
at least one two-way antenna;
a wireless circuit configured to process wireless signals which the at least one two-way antenna transmits and receives;
a power recovery circuit configured to recover electric power from a received signal of the at least one two-way antenna; and
a connection switching circuit configured to connect the at least one two-way antenna to one of the wireless circuit and the power recovery circuit, switch the connection of the at least one two-way antenna between the wireless circuit and the power recovery circuit, and set a duty ratio at which the connection switching circuit connects the at least one two-way antenna to the wireless circuit and the power recovery circuit to attain a desired communication speed, the duty ratio being re-set at a higher stage by comparing the duty ratio with a setting limit of duty ratio to determine whether the duty ratio reaches the setting limit in an event the communication speed is below a predefined threshold speed.

20. Electronic equipment comprising:
a plurality of wireless circuits each of which includes a two-way antenna, wherein each of the plurality of wireless circuit is configured to process wireless signals which the respective two-way antenna transmits and receives;
a power recovery circuit configured to recover electric power from a received signal of the two-way antenna which each of the plurality of wireless circuits includes;
a selection circuit configured to select a particular wireless circuit including a particular two-way antenna, among the plurality of wireless circuits, that recovers the electric power in the power recovery circuitry; and
a connection switching circuit configured to connect the particular wireless circuit to the particular two-way antenna, and switch the connection of the particular two-way antenna between the particular wireless circuit and the power recovery circuit, and set a duty ratio at which the connection switching circuit connects the particular two-way antenna to the particular wireless circuit and the power recovery circuit to attain a desired communication speed, the duty ratio being re-set at a higher stage by comparing the duty ratio with a setting limit of duty ratio to determine whether the duty ratio reaches the setting limit in an event the communication speed is below a threshold speed.

21. Electronic equipment comprising:
a plurality of wireless circuits each of which is configured to process a wireless signal;

a plurality of two-way antennas, each two-way antenna corresponding to a different wireless circuit;

a power recovery circuit configured to recover electric power from signals received by the two-way antennas; and a plurality of connection switching circuits, each connection switching circuit corresponding to a different wireless circuit, wherein each connection switching circuit is configured to connect the corresponding two-way antenna to one of the corresponding wireless circuit and the power recovery circuit, switch the connection of the corresponding two-way antenna between the corresponding wireless circuit and the power recovery circuit, and set a duty ratio at which the connection switching circuit connects the corresponding two-way antenna to the corresponding wireless circuit and the power recovery circuit to attain a desired communication speed, the duty ratio being re-set at a higher stage by comparing the duty ratio with a setting limit of duty ratio to determine whether the duty ratio reaches the setting limit in an event the communication speed is below a predefined threshold speed.

* * * * *